US009282688B2

(12) United States Patent
Casper et al.

(10) Patent No.: US 9,282,688 B2
(45) Date of Patent: Mar. 15, 2016

(54) RESIDUE MONITORING AND RESIDUE-BASED CONTROL

(71) Applicant: DEERE & COMPANY, Moline, IL (US)

(72) Inventors: Robert T. Casper, Mingo, IA (US); Ricky B. Theilen, Altoona, IA (US); John M. Schweitzer, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/262,468

(22) Filed: Apr. 25, 2014

(65) Prior Publication Data

US 2015/0305224 A1    Oct. 29, 2015

(51) Int. Cl.
*A01B 63/28*     (2006.01)
*A01B 79/00*     (2006.01)
*H04N 7/18*      (2006.01)

(52) U.S. Cl.
CPC ............... *A01B 63/28* (2013.01); *A01B 79/00* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 4,843,561 | A * | 6/1989 | Larson | 700/213 |
| 5,653,292 | A * | 8/1997 | Ptacek et al. | 172/4 |
| 5,987,862 | A | 11/1999 | Long et al. | |
| 6,070,673 | A | 6/2000 | Wendte | |
| 6,750,898 | B1 * | 6/2004 | Ishida et al. | 348/89 |
| 8,027,770 | B2 * | 9/2011 | Poulsen | 701/50 |
| 8,393,137 | B1 * | 3/2013 | Crosby | 56/341 |
| 8,408,149 | B2 * | 4/2013 | Rylander | 111/140 |
| 8,448,717 | B2 * | 5/2013 | Adams et al. | 172/4 |
| 8,463,510 | B2 | 6/2013 | Knapp | |
| 8,504,252 | B2 | 8/2013 | Hamilton et al. | |
| 8,522,889 | B2 * | 9/2013 | Adams et al. | 172/4 |
| 8,657,026 | B2 | 2/2014 | Friesen | |
| 8,862,339 | B2 | 10/2014 | Henry et al. | |
| 8,924,097 | B2 * | 12/2014 | Steckel et al. | 701/50 |
| 2001/0016053 | A1 * | 8/2001 | Dickson et al. | 382/110 |
| 2003/0089851 | A1 * | 5/2003 | Katagami et al. | 250/307 |
| 2008/0140431 | A1 * | 6/2008 | Anderson et al. | 705/1 |
| 2009/0076674 | A1 * | 3/2009 | Kiegerl et al. | 701/26 |
| 2009/0210119 | A1 * | 8/2009 | Poulsen | 701/50 |

(Continued)

FOREIGN PATENT DOCUMENTS

DE         10349321 A1      5/2005
DE      102011051827 A1     1/2013

(Continued)

OTHER PUBLICATIONS

European Patent Office, Extended European Search Report in Application No. 15164056.2, dated Sep. 18, 2015.

(Continued)

*Primary Examiner* — Calvin Cheung
*Assistant Examiner* — Krishnan Ramesh
(74) *Attorney, Agent, or Firm* — Ingrassia, Fisher, Lorenz PC (57) ABSTRACT

A computer-implemented method and a control system are described for controlling operations involving residue. The method includes executing a first operation on a field with an implement resulting in residue on the field. A first image is captured with a camera assembly of an area of the field that is ahead of or behind the implement. The first image is analyzed to determine an indicator of residue coverage on the field. A subsequent operation on the field is executed, one or more aspects of which are controlled based upon the determined indicator of residue coverage.

20 Claims, 5 Drawing Sheets

(56) References Cited

U.S. PATENT DOCUMENTS

| | | | |
|---|---|---|---|
| 2011/0093169 A1* | 4/2011 | Schroeder et al. | 701/50 |
| 2011/0270495 A1* | 11/2011 | Knapp | 701/50 |
| 2012/0048159 A1* | 3/2012 | Adams et al. | 111/163 |
| 2012/0048160 A1* | 3/2012 | Adams et al. | 111/163 |
| 2012/0089304 A1 | 4/2012 | Hamilton et al. | |
| 2012/0095652 A1* | 4/2012 | Anderson | 701/50 |
| 2012/0245802 A1* | 9/2012 | Schlesser et al. | 701/50 |
| 2013/0177670 A1* | 7/2013 | Steckel et al. | 426/54 |
| 2013/0325267 A1* | 12/2013 | Adams et al. | 701/50 |
| 2014/0041563 A1 | 2/2014 | Henry et al. | |
| 2014/0116735 A1 | 5/2014 | Bassett | |
| 2014/0303854 A1 | 10/2014 | Zielke | |
| 2014/0358381 A1* | 12/2014 | Holland | 701/50 |
| 2015/0040528 A1* | 2/2015 | Grotelueschen et al. | 56/10.1 |

FOREIGN PATENT DOCUMENTS

| | | |
|---|---|---|
| JP | 9000137 A | 1/1997 |
| WO | 2008135867 A2 | 11/2008 |
| WO | 2013134480 A1 | 9/2013 |

OTHER PUBLICATIONS

Precision Agriculture, Dynamically Adjustable Tillage Systems from Gates Manufacturing, News Letter, Jun. 16, 2015.

Farm Food Care.Org, Farming & the Environment, Crop Residue Cover Assessment with a Mobile Technology Application on Ontario Farmland, Informational Page, Admitted Prior Art.

Farm Food Care.Org, Crop Residue Assessment with a Mobile Technology Application on Ontario Farmland, Informational Sheet, Admitted Prior Art.

* cited by examiner

RESIDUE MONITORING AND RESIDUE-BASED CONTROL

CROSS-REFERENCE TO RELATED APPLICATIONS

Not applicable.

STATEMENT OF FEDERALLY SPONSORED RESEARCH OR DEVELOPMENT

Not applicable.

FIELD OF THE DISCLOSURE

This disclosure relates to monitoring residue and controlling operations involving residue.

BACKGROUND OF THE DISCLOSURE

Various agricultural or other operations may result in residue covering a portion of the area addressed by the operation. In an agricultural setting, for example, residue may include straw, corn stalks, or various other types of plant material, which may be either cut or un-cut, and either loose or attached to the ground to varying degrees. Agricultural residue may result, for example, from tillage operations, which may generally cut and bury plant material to varying degrees and, accordingly, may result in residue of various sizes covering the tilled ground to various degrees. Notably, the size and coverage of residue may vary from location to location even within a single field, depending on factors such as the local terrain and soil conditions of the field, local plant coverage, residue characteristics before the instant tillage (or other) operation, and so on. Residue coverage may generally be characterized by at least two factors: percent coverage (i.e., percentage of a given area of ground that is covered by residue) and residue size (i.e., a characteristic length, width or area of individual pieces of residue).

SUMMARY OF THE DISCLOSURE

A control system and computer-implemented method are disclosed for monitoring residue coverage and controlling various operations based on residue coverage.

According to one aspect of the disclosure, a computer-implemented method for residue management for an implement with a camera assembly includes executing a first operation on a field with the implement, wherein the first operation results in residue on the field. A first image is captured with the camera assembly of an area of the field that is ahead of or behind the implement. The first image is analyzed to determine an indicator of residue coverage on the field. A subsequent operation on the field is executed, one or more aspects of which are controlled based upon the determined indicator of residue coverage.

In certain embodiments, the subsequent operation may utilize a different implement from the first operation and may not form part of a continuous series of operations with the first operation. The indicator of residue coverage may be associated with a location of the implement on the field and the subsequent operation controlled based upon, at least in part, the location. The indicator of residue coverage may include an indicator of percent residue coverage, or of residue size. The camera assembly may include a stereo image camera assembly or an infrared camera system.

In certain embodiments, the first image may be an image of an area behind the implement and a second image may be captured of an area of the field ahead of the implement. The areas imaged by the first and second image may overlap and the two images may be compared to determine the indicator of residue coverage.

In certain embodiments, the implement may be a tillage implement. The first operation may include a first portion of a tillage operation with the implement and the subsequent operation may include a second portion of the same tillage operation. Controlling one or more aspects of the subsequent operation may include adjusting a depth or down-pressure of a plurality of tillage tools included on the implement.

According to another aspect of the disclosure, a control system includes one or more processor devices, one or more memory architectures coupled with the one or more processor devices, and at least one camera assembly in communication with the one or more processor devices. The one or more processor devices are configured to execute functionality similar to the method described above.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example implementations of the disclosed system and method, as shown in the accompanying figures of the drawings described briefly above.

As noted above, various operations may result in residue on a field. For example, a primary tillage operation utilizing various rippers, cutting disks, and other tools may both cut and bury plant material along a field to varying degrees. Generally, after such an operation (and others), some amount of residue (i.e., cut and un-cut plant material) may be left on the field surface. Such residue may generally be characterized at least by a percent coverage (i.e., a percentage of a given area of ground that is covered by residue) and a characteristic residue size (i.e., an average, nominal, or other measurement of the length, width or area of particular pieces of residue).

In certain applications, it may be useful to understand the characteristics of residue coverage with relative accuracy. For example, certain regulatory standards addressing erosion and other issues may specify a target percent coverage for residue after a particular operation, such as a primary or secondary tillage operation, a planting operation, a spraying operation, and so on. In various instances, it may also be useful to understand the characteristic (e.g., average) size of residue over a given area of a field. In certain operations, it may be useful to understand both percent coverage and residue size. For example, in order to execute an effective primary tillage operation an operator may endeavor to leave at least 30% residue coverage, with no more than 10% of residue material being larger than 4 inches long.

In this light, it may be useful to provide a system and method for actively assessing aspects of residue coverage during a particular operation and utilizing this assessment to guide ongoing aspects of the particular operation or a different, future operation. For example, for a primary tillage (or other) operation, it may be useful to provide a control system that determines the percent coverage and characteristic size of residue on a portion of field that has already been tilled (or otherwise addressed), then utilize the determined percent coverage and characteristic size to guide the continuing tillage (or other) operation or a future operation (e.g., a secondary tillage operation or planting operation) on the same field. Various discussions herein may specifically address tillage operations using tillage implements. It will be understood, however, that the system and method disclosed herein may be utilized for a variety of other operations and a variety of other implements.

In certain embodiments, one or more camera assemblies may be provided for a tillage (or other) implement, which assemblies may be capable of capturing visible, infrared, or other images of a field on which the implement is operating. In certain embodiments, at least one camera may be mounted to the tillage implement so as to capture images of an area of ground immediately behind the tillage implement. In certain embodiments, at least one other camera may be mounted to the implement so as to capture images of an area of ground immediately ahead of the tillage implement. (In this context, it will be understood that "ahead," "behind," and similar positional references may not necessarily indicate locations that are entirely forward or aft of every component of the relevant implement. Rather, these references may indicate locations that are forward or aft of the various tools or other components of the implement that may affect residue coverage on the field. For example, for a tillage implement with two front disk gangs, a central ripper assembly, and a back closing disk assembly a camera capturing images of an area "ahead" of the implement may be viewed as capturing images on an area that is forward of the front-most disk gang. Likewise, a camera capturing images of an area "behind" the implement may be viewed as capturing images of an area that is aft of the closing disk assembly.)

In certain embodiments, the various camera assemblies may capture images in the visible spectrum, in color or in grayscale, in infrared, based upon reflectance or fluorescence, or otherwise. In certain embodiments, one or more camera assemblies may include stereo image camera assemblies capable of capturing stereo images of the field. For example, one or more camera assemblies may include a stereo camera with two or more lenses and image sensors, or one or more camera assemblies may include multiple cameras arranged to capture stereoscopic images of the field.

A computer system or device associated with the relevant implement may analyze the images of the field captured by the one or more camera assemblies in order to determine an indicator of residue coverage on the field. In certain embodiments, for example, the computer system or device may analyze the images in order to determine an indicator of residue coverage, such as a percent coverage of residue in the imaged area of the field or a characteristic size (or size distribution) of residue in the imaged area of the field. An image may be analyzed in a variety of ways, including through edge-finding algorithms, color- or grayscale-gradient analysis, or other techniques.

In certain embodiments, images from behind an implement (i.e., "aft" images) may be analyzed, in order to determine indicators of residue coverage for areas of a field that have already been tilled (or otherwise addressed by the relevant operation). In certain embodiments, images from ahead of an implement (i.e., "forward" images) may also be analyzed, in order to determine indicators of residue coverage for areas of field that have not yet been tilled (or otherwise addressed) in the current pass of the implement. The forward images (or residue coverage information derived therefrom) may then be compared with aft images of the same (or similar) areas of the field (or residue coverage information derived therefrom) in order to assess the change in residue coverage due to the instant operation.

Once a residue coverage indicator has been determined, the indicator may be utilized to control aspects of a future operation over the field. For example, in an ongoing tillage operation, if residue indicators from an aft image indicate insufficient residue coverage or size, various aspects of the relevant tillage implement (e.g., disk or ripper depth) may be automatically adjusted in order to provide greater residue coverage or size. Similarly, if a comparison of residue indicators from forward and aft images indicates that an ongoing tillage operation is decreasing residue coverage or size too aggressively, various aspects of the relevant implement may be automatically adjusted accordingly.

In certain embodiments, a residue coverage indicator may be utilized to control aspects of a future operation that is distinct from the operation during which the indicator was determined. For example, residue coverage indicators from a primary tillage operation may be associated with location readings from a global positioning system ("GPS") device in order to construct a map of residue coverage over various areas of a field. During a later secondary tillage operation, these location-specific residue coverage indicators may then be utilized in order to appropriately control the secondary tillage implement. For example, if residue coverage indicators from the primary tillage operation indicate excessive residue coverage over a portion of a field, during a secondary tillage operation various tools on a secondary tillage implement may be automatically controlled to more aggressively till that portion of the field. Likewise, location-specific reside coverage indicators from a first pass of a primary tillage (or other) operation may be used to automatically control aspects of tillage (or other) tools on a second pass of the operation.

In certain embodiments, the computer system or device may be included on the relevant implement (e.g., as part of an embedded control system). In certain embodiments, the computer system or device may be included on another platform (e.g., a tractor towing the implement or a remote ground-station) and may communicate with various devices on the implement (e.g., various control devices) via various known means. In certain embodiments, the computer system or device may be in communication with a CAN bus associated with the implement or an associated vehicle, in order to send and receive relevant control and data signals.

As noted above, the system and method described herein may be implemented with respect to a variety of implements, including various agricultural or other work implements. In certain embodiments, the described system and method may be implemented with respect to a primary tillage implement.

Referring, for example, to FIGS. 1-4, example primary tillage implement is depicted as mulcher-ripper implement 10.

As depicted, implement 10 includes a coupling mechanism 12 for coupling the implement 10 to a vehicle (not shown). This may allow implement 10 to be towed across a field 16 in forward direction 14 in order to execute a tillage operation. It will be understood that other embodiments may include self-driven implements that may execute various operations without being towed by a separate vehicle.

Figure 1:
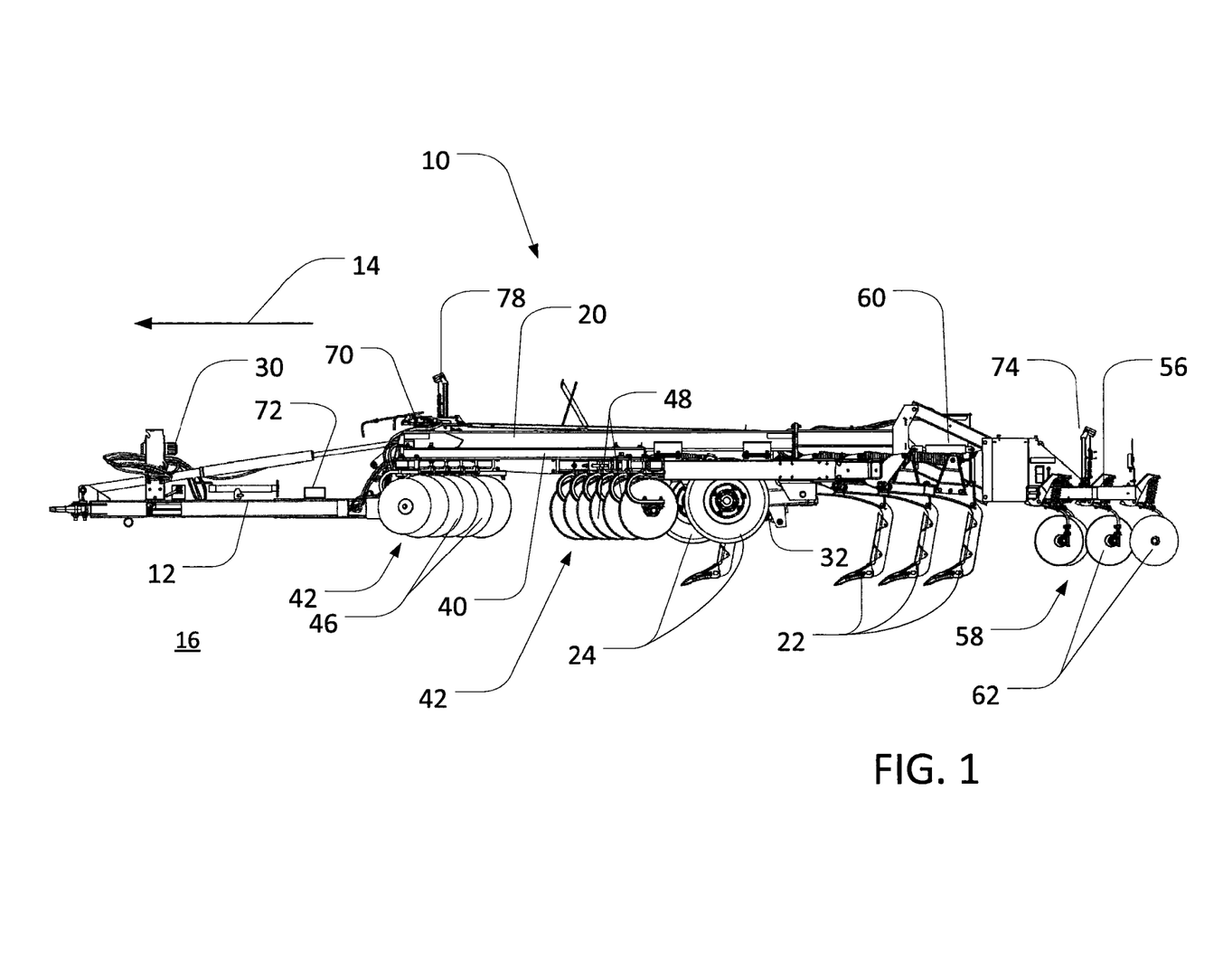
FIG. 1 is a side view of an example tillage implement with respect to which the disclosed system and/or method may be implemented, with a wheel assembly in a retracted orientation.
Figure 2:
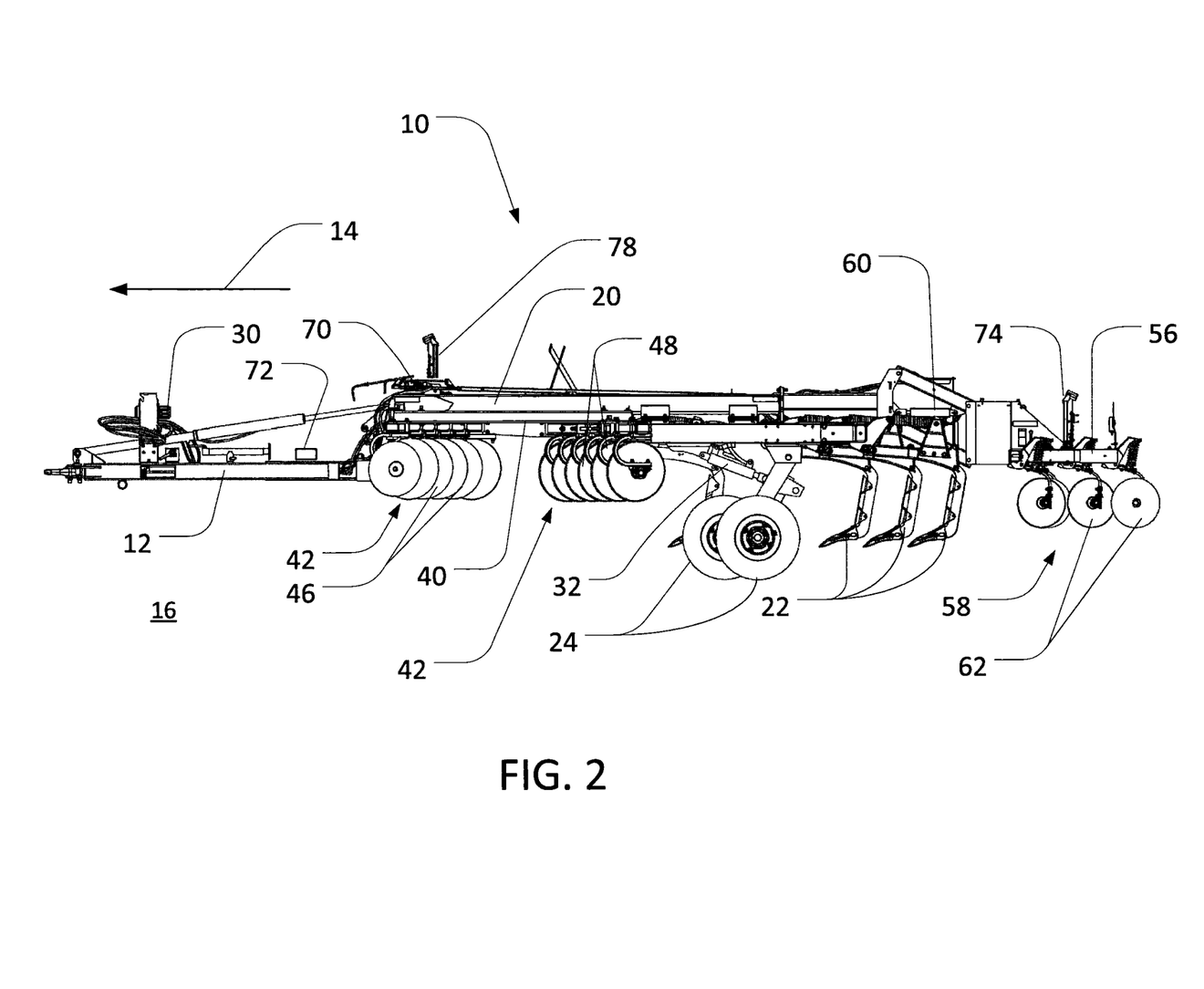
FIG. 2 is another side view of the tillage implement of FIG. 1, with the wheel assembly in an extended orientation.
Figure 3:
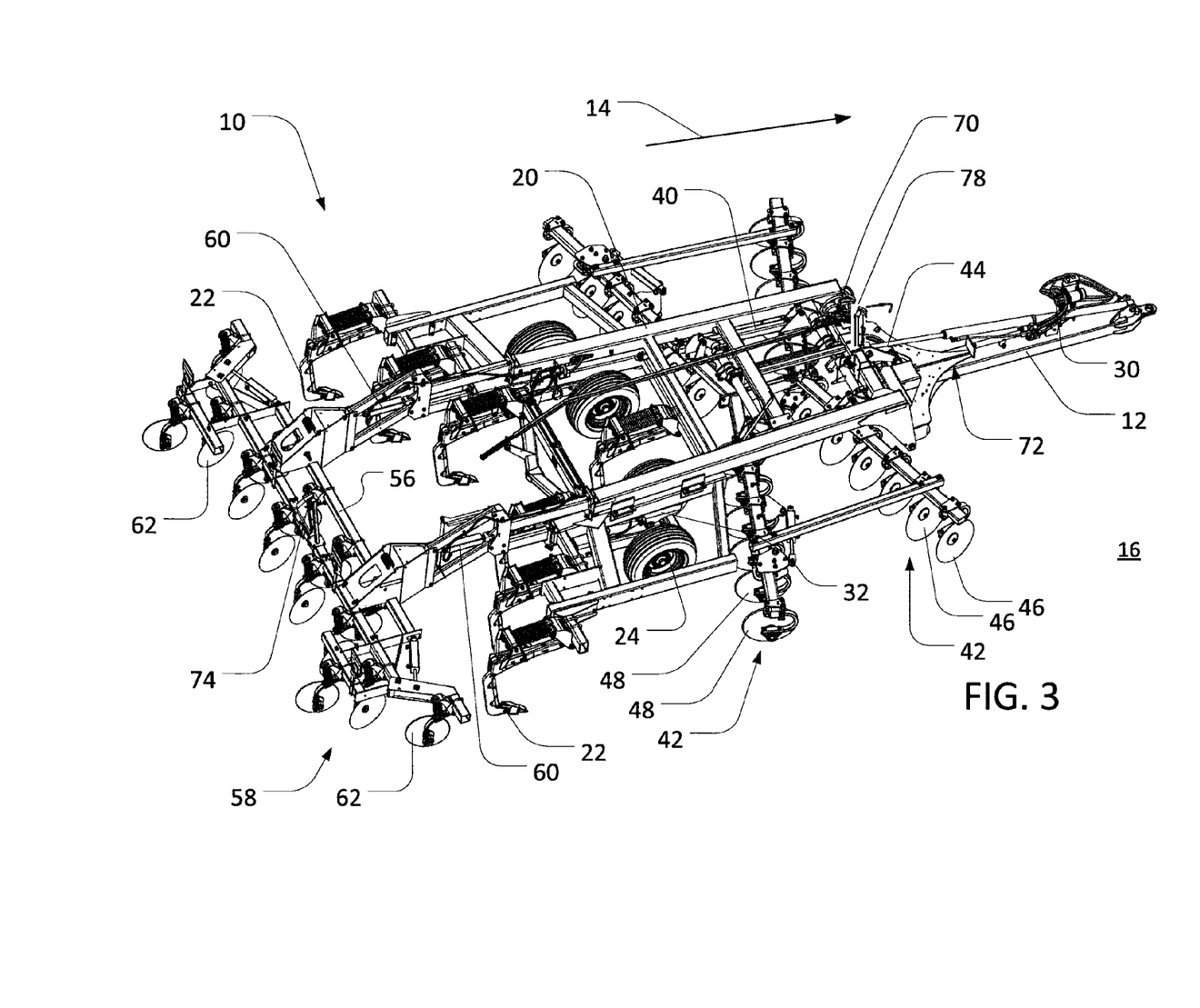
FIG. 3 is a perspective view of the tillage implement of FIG. 1, with the wheels assembly in the retracted orientation.

Implement 10 may further include a first frame section 20, which may be connected to the coupling mechanism 12 and generally extend in an aft direction away from the coupling mechanism 12. A first set of ground-engaging tools may be coupled to the first frame section 20. As depicted in FIGS. 1-3, for example, a set of shanks 22 may be coupled to the first frame section 20. It will be understood, however, that other tools may additionally (or alternatively) be utilized. In certain embodiments a plurality of wheel assemblies 24 may also be coupled to the first frame section 20, in order to support the first frame section 20 above the field 16.

The implement 10 may include (or may be in communication with) one or more controllers, which may include various electrical, computerized, electro-hydraulic, or other controllers. In certain embodiments, for example, an electrohydraulic controller 30 may be mounted to the coupling mechanism 12. The controller 30 may include various processors (not shown) coupled with various memory architectures (not shown), as well as one or more electrohydraulic valves (not shown) to control the flow of hydraulic control signals to various devices included on the implement 10. In certain embodiments, the controller 30 may be in communication with a CAN bus associated with the implement 10 (or the towing vehicle (not shown)).

In certain embodiments, one or more hydraulic cylinders 32 (or other lift devices) may be coupled to the first frame section 20 and to the wheel assemblies 24. The cylinders 32 may be in hydraulic (or other) communication with the controller 30, such that the controller 30 may signal the cylinders 32 to raise or lower the first frame section 20 relative to the field 16 in order to move the various shanks 22 to various orientations between a preliminary position (e.g., FIG. 1) and a particular operating depth (FIG. 2). In certain embodiments, activation of the hydraulic cylinders 32 by the controller 30 may result in the shanks 22 being moved over a range of sixteen inches or more (e.g., between the orientations depicted in FIGS. 1 and 2). Such movement of the shanks 22 relative to the field 16 may be useful with regard to residue management. For example, deeper penetration of the shanks 22 into the field 16 may tend to bury more plant matter and therefore result in smaller percentage coverage of residue.

It will be understood that other configurations may also be possible. For example, in certain embodiments, the hydraulic cylinder 32s (or another lift device) may be coupled directly to the shanks 22 (or associated support components) rather than the wheel assemblies 24, in order to directly move the shanks 22 relative to the field 16.

Implement 10 may also include a second frame section 40, which may be pivotally coupled to the first frame section 20 (e.g., at one or more pivot points forward of the shanks 22. In certain embodiments, a second set of ground-engaging tools may be coupled to the second frame section 40. As depicted in FIGS. 1-3 and 4B, for example, a set of disk gang assemblies 42 may be coupled to the second frame section 40. It will be understood, however, that other tools may additionally (or alternatively) be utilized.

In certain embodiments, the disks 46 of the forward disk gang assembly 42 may be angled generally outward and the disks 48 of the rearward disk gang assembly 42 may be angled generally inward. In this way, the disks 46 may generally auger soil and plant matter (including residue) outward away from the centerline of implement 10, and the disks 48 may generally auger soil and plant matter (including residue) inward toward the centerline of implement 10. It will be understood, however, that other configurations may be possible, including configurations with differently angled disks 46 or 48, configurations with a different number or arrangement of disk gang assemblies 42, and so on.

In certain embodiments, one or more hydraulic cylinders 44 (or other lift devices) may be coupled to the first frame section 20 and to the second frame section 40. The cylinders 44 may be in hydraulic (or other) communication with the controller 30, such that the controller 30 may signal the cylinders 44 to pivot the second frame section 40 relative to the first frame section 20 in order to move the disk gang assemblies 42 relative to the first frame section 20. In this way, controller 30 may adjust the down-pressure of the disk gang assemblies 42 on the field 16 as well as the penetration depth of the disks of the assemblies 42 into the field 16. In certain embodiments, activation of the hydraulic cylinders 44 by the controller 30 may result in the disk gang assemblies 42 being moved over a range of eight inches or more. Such movement of the disk gang assemblies 42 relative to the field 16 may be useful with regard to residue management. For example, deeper penetration of the disks 46 and 48 into the field 16 may tend to bury more plant matter and therefore result in smaller percentage coverage of residue. Similarly, greater down-pressure of the disks 46 and 48 on the field 16 may result in a greater amount of plant material being cut by the disks 46 and 48 and, accordingly, in a generally smaller characteristic residue size.

It will be understood that other configurations may also be possible. For example, in certain embodiments, the hydraulic cylinders 44 (or another lift device) may be coupled directly to the disk gang assemblies 42 (or associated support components) rather than the second frame section 40, in order to directly move the disk gang assemblies 42 relative to the field 16.

Implement 10 may also include a third frame section 56, which may be pivotally coupled to the first frame section 20 (e.g., at one or more pivot points aft of the shanks 22). In certain embodiments, a third set of ground-engaging tools may be coupled to the third frame section 56. As depicted in FIGS. 1-3 and 4A, for example, a closing disk assembly 58 may be coupled to the third frame section 56. It will be understood, however, that other tools may additionally (or alternatively) be utilized.

In certain embodiments, one or more hydraulic cylinders 60 (or other lift devices) may be coupled to the first frame section 20 and the third frame section 56. The cylinders 60 may be in hydraulic (or other) communication with the controller 30, such that the controller 30 may signal the cylinders 60 to pivot the third frame section 56 relative to the first frame section 20 in order to move the closing assembly 58 relative to the first frame section 20. In this way, controller 30 may adjust the depth of the disks 62 of the assembly 58 relative to the field 16. In certain embodiments, activation of the hydraulic cylinders 60 by the controller 30 may result in the disks 62 being moved over a range of eight inches or more. Such movement of the disks 62 may also be useful with regard to residue management.

It will be understood that other configurations may also be possible. For example, in certain embodiments, the hydraulic cylinders 60 (or another lift device) may be coupled directly to the closing disk assembly 58 (or associated support components) rather than the third frame section 56, in order to directly move the closing disk assembly 58 relative to the field 16.

Various other control devices and systems may be included on (or otherwise associated with) implement 10. For example, a depth control device 70 may be mounted to the first frame section 20 and may be in hydraulic, electronic or other communication with controller 30, and cylinders 32, 44, and 60. The depth control device 70 may include various sensors (e.g., rotational sensors, potentiometers, pressure transducers, hall-effect rotational sensors, and so on) configured to sense indications (e.g., pressure, relative position, or combination of pressure and relative position) of the relative location (e.g., relative depth with respect to field 16) of the shanks 22, the disks 46 and 48, the disks 62, or various other tools (not shown). A control unit (e.g., a control unit included in the controller 30) may receive signals from the various sensors associated with control device 70 that may indicate a particular orientation (e.g., depth) of shanks 22, disks 46 and 48, or disks 62. The control unit may then, using open loop, closed loop, proportional-integral-derivative "PID," or other control methodologies, determine an appropriate control signal to cause the cylinders 32, 44, and 60 to adjust, respectively, the orientation the shanks 22, disks 46 and 48, and disks 62, as appropriate. In this way, for example, the combined system of controller 30, the sensors of control device 70 and the cylinders 32, 44, and 60 may move the shanks 22, disks 46 and 48, and disks 62 to, and maintain these devices at, any desired orientation.

In certain embodiments, one or more location-sensing devices may also be included on (or otherwise associated with) the implement 10. For example, a GPS device 72 may use GPS technology to detect the location of the implement 10 along the field 16 at regular intervals (e.g., during a tillage operation). The detected locations may then be communicated via various known means to the controller 30 (or another computing device) in order to inform various control strategies. In certain embodiments, the detected locations may additionally (or alternatively) be communicated to one or more remote systems. For example, GPS device 72 may wirelessly transmit location information for the implement 10 to a remote monitoring system for tracking of various aspects of the operation of the implement 10. In certain embodiments, as depicted in FIGS. 1-4, the GPS device 72 may be mounted to implement 10. In certain embodiments, the GPS device 72 may be mounted in other ways, including to a vehicle (not shown) that tows the implement 10 along the field 16.

In certain embodiments, one or more camera assemblies may also be included on (or otherwise associated with) the implement 10. In certain embodiments, referring in particular to FIGS. 4A and 4B, aft camera assembly 74 may be mounted to the implement 10 (or otherwise positioned) in order to capture images at least of an area 76 behind the implement 10 (i.e., "aft images"). In certain embodiments, forward camera assembly 78 may additionally (or alternatively) be mounted to the implement 10 (or otherwise positioned) in order to capture images at least of an area 80 forward of the implement 10 (i.e., "forward" images). The camera assemblies 74 and 78 may be in electronic (or other) communication with the controller 30 (or other devices) and may include various numbers of cameras of various types. In certain embodiments, one or both of the assemblies 74 and 78 may include an infrared camera to capture infrared images. In certain embodiments, one or both of the assemblies 74 and 78 may include a grayscale camera to capture grayscale images. In certain embodiments, one or both of the assemblies 74 and 78 may include a stereo camera assembly capable of capturing stereo images. For example, one or both of the assemblies 74 and 78 may include a stereo camera with two or more lenses and image sensors, or multiple cameras arranged to capture stereoscopic images of the areas 76 and 80.

Images may be captured by camera assemblies 74 and 78 according to various timings or other considerations. In certain embodiments, for example, the respective assemblies 74 and 78 may capture images continuously as implement 10 executes a tillage (or other) operation on the field 16. In certain embodiments, embedded control system (not shown) for each assembly 74 and 78 may cause the respective assemblies 74 and 78 to capture images of the areas 76 and 80, respectively, at regular time intervals as implement 10 executes a tillage (or other) operation on the field 16.

In certain embodiments, the timing of image capture by aft camera assembly 74 may be offset from the timing of image capture by forward camera assembly 78 such that the portion of the field 16 within the image area 76 when the aft camera assembly 74 captures an image substantially overlaps with the portion of the field 16 that was within the image area 80 when the forward camera assembly 78 captured a prior image. As such, for example, the relative timing of image capture for the two assemblies 74 and 78 may be varied by a control system (e.g., controller 30) based upon the wheel speed of implement 10.

Figure 4A:
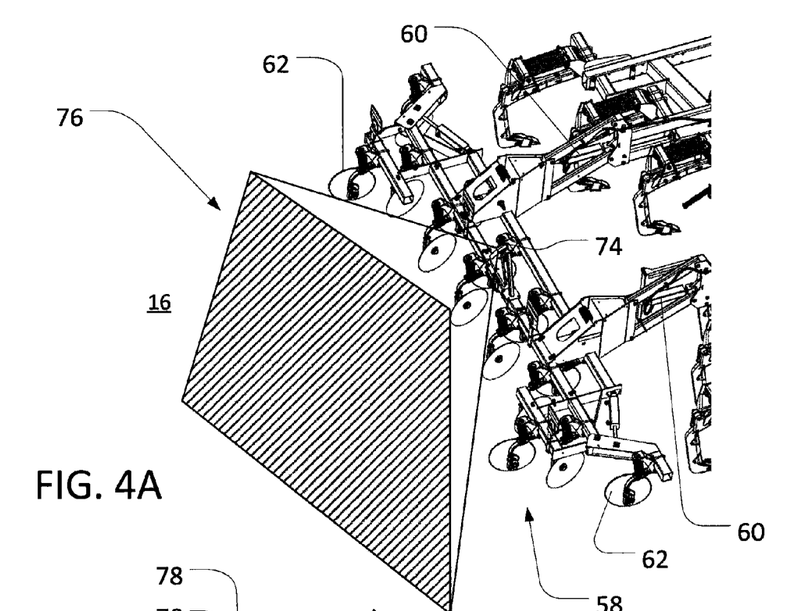
FIGS. 4A and 4B are partial perspective views of the tillage implement of FIG. 1, showing, respectively, aft and forward image areas.
Figure 4B:
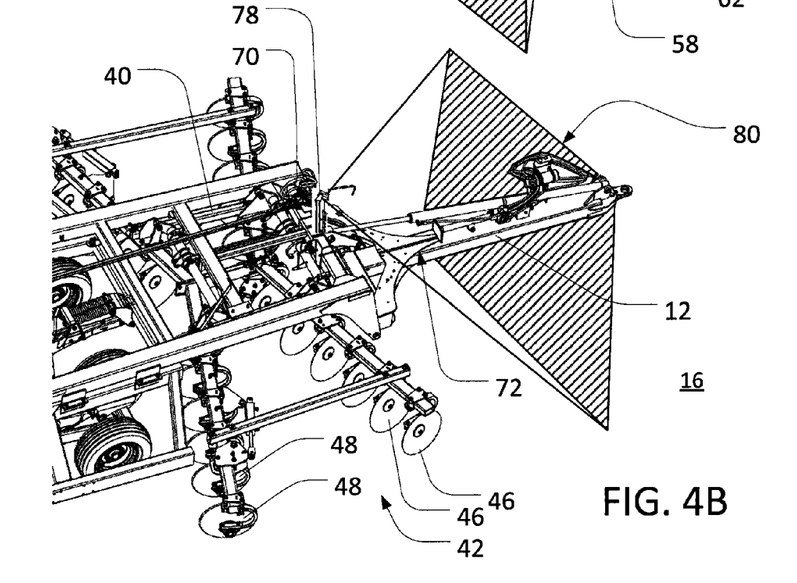

It will be understood that the image capture areas 76 and 80 of FIGS. 4A and 4B are presented as example image capture areas only, and that images may additionally (or alternatively) be captured of different areas of the field 16. Likewise, the mounting locations of the forward and aft camera assemblies 78 and 74 are presented as examples only, and the camera assemblies 78 and 74 (or various other camera assemblies) may be mounted at various other locations. In certain embodiments, one or more camera assemblies may be mounted to a vehicle (not shown) that is towing the implement 10, or at various other locations.

Figure 5:
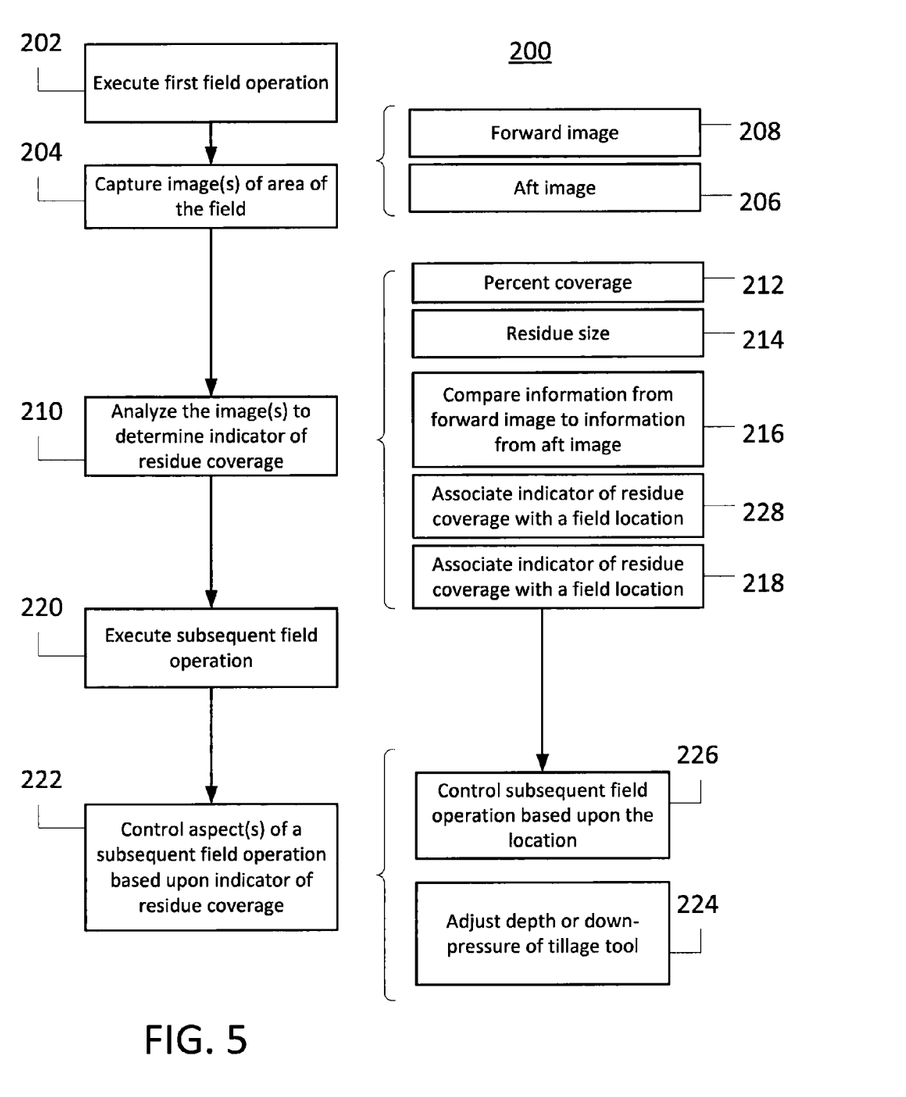
FIG. 5 is a process diagram associated with a method for residue monitoring and management for the tillage implement of FIG. 1.

Referring also to FIG. 5, a residue monitoring and residue-based control ("RMRC") method 200 may be implemented with respect to mulcher-ripper implement 10, or various other implements (not shown). In certain embodiments, instruction sets and subroutines for an RMRC process (e.g., RMRC process 200) may be stored on a storage device included in the controller 30 (or another device), may be executed by one or more processors and one or more memory architectures included in the controller 30 (or another computing device). For the following discussion, the RMRC process 200 will be described for illustrative purposes, although it will be understood that other configurations may be possible.

In certain implementations, an RMRC process (e.g., the RMRC process 200) may be a stand-alone processes. In certain implementations, an RMRC process may operate as part of, or in conjunction with, one or more other processes and/or may include one or more other processes. Likewise, in certain implementations, an RMRC process may be represented and implemented by an entirely hardware-based configuration, in addition or as an alternative to a configuration having an RMRC process 200 as a set of instructions stored in a particular memory architecture (e.g., within the controller 30).

In certain embodiments, the RMRC process 200 may include executing 202 a first operation in a field, wherein the operation involves residue. In certain implementations, the operation may be a tillage operation (e.g., a primary or secondary tillage operation), which may utilize the mulcher-ripper implement 10. In certain implementations, the process 200 may include executing 202 a different operation, such as a spraying operation, a planting operation, a baling operation, and so on. As such, various implements other than the implement 10 may be utilized.

In certain implementations, the relevant operation may be executed 202 automatically. For example, the controller 30 may direct implement 10 to conduct a tillage operation. In certain implementations, the relevant operation may be executed 202 in response to operator (or other) input. For example, an operator may activate a towing vehicle (not shown) to tow the implement 10 across the field 16 in a tillage operation.

In certain implementations, various functionality included in method 200 may proceed automatically as long as the relevant implement (e.g., implement 10) is executing 202 the relevant operation (e.g., a tillage operation). For example, in certain implementations, the controller 30 (or another controller) may detect the execution 202 of the relevant operation, which may trigger subsequent functionality of the RMRC process 200 (e.g., as implemented by the controller 30). For example, the controller 30 may determine that the implement 10 is moving across a field to execute 202 a tillage operation based upon wheel speed sensors (not shown), location information from GPS device 72, communication with the towing vehicle (not shown) via a CAN bus, or otherwise.

As the relevant operation (e.g., a tillage operation) is executed 202, one or more camera assemblies may capture 204 one or more images of an area of the field. The captured 204 images may include images of an area that is currently forward of the relevant implement (i.e., forward images 208) and may include images of an area that is currently aft of the relevant implement (i.e., aft images 206). In certain embodiments, only forward images 208 may be captured 204, only aft images 206 may be captured, or both forward and aft images 208 and 206 may be captured 204. Various images 206 and 208 may be captured continuously, at pre-determined times, in response to particular events (e.g., the implement passing a marker on a field, entering a particular field region, or undergoing any variety of transient event), or at pre-determined intervals (e.g., every 3 seconds).

With respect to the implement 10, for example, the aft camera assembly 74 may capture 204 one or more aft images 206 of aft image area 76 and the forward camera assembly 78 may capture 204 one or more forward images 208 of forward image area 80. The various forward images 208 and aft images 206 may be captured continuously (e.g., as a video stream), at predetermined intervals, or based upon other criteria.

In certain implementations, the timing of the capture 204 of forward images 208 and aft images 206 may be arranged so that at least one captured 204 forward image 208 and at least one captured 204 aft image 206 include substantially similar (e.g., substantially overlapping) views of the field 16. For example, where implement 10 is moving with a known speed and direction while executing 202 a tillage operation, the area of the field 16 falling within the forward image area 80 at a particular time may fall within the aft image area 76 a known amount of time later. Accordingly, where both forward and aft images 208 and 206 are acquired 204 non-continuously, it may be possible for the RMRC process 200 to control the timing of the capture 204 of the images, respectively, by camera assemblies 78 and 74 such that the two assemblies 78 and 74 each capture 204 images of substantially the same portion of the field. For example, if the implement 10 is being towed at a speed of 4 m/s and there are 2 meters separating the two image areas 76 and 80, the RMRC process 20 may direct aft camera assembly 74 to capture 204 images with an offset of 0.5 seconds from the capture 204 of corresponding images by forward camera 78.

Similarly, if images are captured 204 continuously by the two camera assemblies 74 and 78, corresponding frames from the two assemblies 74 and 78 (i.e., frames representing images 208 and 206 of the same portion of the field 16) may be determined based on the amount of time the implement 10 requires to travel the distance between the forward and aft image areas 80 and 76. For example, if the implement 10 is being towed at a speed of 4 m/s and there are 2 meters separating the two image areas 76 and 80, the RMRC process 20 may determine that an image frame captured 204 by the aft camera assembly 74 may include a view of a similar area of the field 16 as an image frame captured 206 by the forward camera assembly 0.5 seconds earlier in time.

Because the captured 204 images are to be utilized, at least in part, to assess residue coverage and, potentially, to corresponding control of various operations (as described in greater detail below), it may be useful for the images to include views of areas of the field 16 that are relatively nearby the relevant implement. Accordingly, as noted above, the view of an aft camera assembly may be generally directed toward an aft image area that is relatively close to the rearmost active portion of the relevant implement (e.g., an area immediately behind the rearmost tool or component that may affect residue coverage). Similarly, the view of a forward camera assembly may be generally directed toward a forward image area that is relatively close to the most forward active portion of the relevant implement (e.g., an area immediately ahead of the most forward tool or component that may affect residue coverage).

Even with the above-noted alignment of the various camera assemblies however, variations in the terrain of a field (or other factors) may sometimes result in a captured 204 image including a view of terrain (or other things) that is relatively far from the relevant implement. For example, as an implement crests a rise in rolling terrain, the view of the forward and aft camera assemblies, in turn, may be temporarily directed over the rise such that a captured 204 image includes distant features rather than areas of the field adjacent to the implement. It may be useful, in this and similar instances, to discard such images with respect to residue coverage analysis.

In certain embodiments, it may be useful to employ stereo-image capture 204 for this purpose, due to the perspective information discernible from stereo images. For example, when a stereo image is captured 204, the RMRC process 200 may utilize perspective information in the image to analyze whether features in the image are appropriately close to the relevant implement, or whether those features are inappropriately distant from the implement (e.g., due to the relevant camera assembly view temporarily extending over a rise in the terrain). If the features are inappropriately distant, the RMRC process 200 may select a new image (or set of images) for subsequent analysis. For example, the RMRC process 200 may wait a predetermined amount of time, then direct the camera assemblies to capture 204 new images, or may wait a predetermined amount of time, then select a new image that was automatically captured 204 (e.g., due to a continuous or set-interval image capture 204 configuration).

Once an appropriate image or set of images has been captured 204, the RMRC process 200 may analyze 210 the captured 204 image(s) to determine an indicator of residue coverage. As noted above, residue may include straw, corn stalks, or various other types of plant material, which may be either cut or un-cut, and either loose or attached to the ground to varying degrees. Residue coverage may include various measures of the degree to which residue covers a portion of a field, including percent residue coverage 212, residue size 214, absolute area covered by residue, and various other measures.

Percent residue coverage 212 may generally refer to the percent of a particular area of field that is covered by residue. In certain implementations, it may be useful for the RMRC process 200 to determine percent residue coverage 212 for a particular segment of a field. For example, if an operator is attempting to provide a particular percent residue coverage 212 (or range of percent residue coverage 212) in all areas of a field, it may be useful to determine the local percent residue coverage 212 at various locations around the field. In certain implementations, it may be useful for the RMRC process 200 to determine percent residue coverage 212 for an entire field. For example, if an operator desires a field to have an average field-wide percent residue coverage 212, it may be useful to determine a running average of percent residue coverage 212 for the entire field.

Residue size 214 may generally refer to a characteristic or average size of residue. In certain implementations, residue size 214 may address length or width of residue. For example, the RMRC process 200 may determine the characteristic length or width of residue in a captured 204 image with respect to a particular direction (e.g., the path of travel of the relevant implement) or in from an absolute perspective (e.g., irrespective of the path of travel of the relevant implement). In certain implementations, residue size 214 may address projected (or absolute) surface area of residue. For example, the RMRC process 200 may determine an average surface area of residue in a captured 204 image, as projected onto the area of the field included in the image.

The RMRC process 200 may analyze 210 images to determine indicators of residue coverage in a variety of ways including with edge-finding algorithms, color- or grayscale-gradient analysis, analysis based upon reflectance or fluorescence, or with various other techniques. In certain embodiments, the RMRC process 200 may analyze 210 images locally (e.g., within the controller 30 of the implement 10). In certain embodiments, the RMRC process 200 may communicate with various remote systems in order to analyze 210 various images. For example, the RMRC process 200 may wirelessly transmit image data for a remote computing system for analysis. In certain embodiments, the RMRC process 200 may store various captured 204 images locally or remotely for later retrieval or analysis 210.

In certain embodiments, the RMRC process 200 may analyze 210 images in order to determine indicators of residue coverage by, at least in part, comparing 216 information from one or more forward images 208 to information from one or more aft images 206. For example, the RMRC process 200 may identify a forward image 208 and an aft image 206 that include a view of the same portion of a field and may compare the images in order to determine the effect of the passage of the relevant implement on residue coverage over that portion of the field. In certain implementations, for example, the RMRC process 200 may separately analyze 210 each of the images 206 and 208 to determine separate indicators of residue coverage (e.g., indicators of percent residue coverage or characteristic residue size for each image), then may compare 216 the separate indicators in order to determine the change in residue coverage caused by the passage of the relevant implement. For example, if the RMRC process 200 determines a percent residue coverage of 25% for the forward image 208 and a percent residue coverage of 15% for the aft image 206, this may indicate that passage of the implement has resulted in a 10% absolute reduction in percent residue coverage 212 for the analyzed 210 area of the field.

Similarly, in certain implementations, the RMRC process 200 may compare 216 the captured 204 images 206 and 208 themselves or may compare 216 a portion of the information included in the images 206 and 208, before determining the indicator(s) of residue coverage. For example, the RMRC process 200 may execute a pixel-by-pixel comparison operation on the images 206 and 208 (e.g., a pixel-by-pixel subtraction of brightness values), then may analyze 210 the resulting information to determine residue coverage information.

In certain implementations, the RMRC process 200 may associate 218 a particular captured 204 image or an indicator of residue coverage determined by analysis 216 of a particular captured 204 image with a particular location on a field. This association 218 (and the associated image) may then be stored locally or remotely for later use. For example, an image captured by the forward camera assembly 78 of the implement 10 may be associated 218 with a GPS reading from the GPS device 72 in order to link that image to a particular location on the field 16. In certain implementations, the location information and the image (or a residue coverage indicator determined from analysis 210 of the image) may then be stored so that later operations on that location of the field 16 may retrieve the image (or the residue coverage indicator) as a useful reference. Further, in certain implementations, the location information and the image (or an associated residue coverage indicator) may be utilized in conjunction with other location-associated information. For example, the RMRC process 200 may compare determined residue coverage indicators for a particular location in a field (e.g., a location determined via the GPS device 72) to a target residue coverage indicator previously associated with that particular location.

As described in detail above, the RMRC process 200 may be generally useful for assessing residue coverage of a field (or portions thereof) even during an active operation (e.g., a primary tillage operation with the implement 10). Further, in certain implementations, the RMRC process 200 may advantageously utilize the determined residue coverage information to control 222 aspects of the execution 220 of a subsequent operation.

In certain implementations, the subsequent operation may be a continuation of the first operation (e.g., may, with the first operation, for part of a continuous series of operations). For example, in a primary tillage operation utilizing the implement 10, a first operation may be the tilling of a first portion of the field 16 and a subsequent operation may be the tilling of a second (e.g., adjacent) portion of the field 16. As such, as described in greater detail below, analysis 210 of images that are captured 204 during a continuous and ongoing tillage (or other) operation on the field 16 may be utilized to control 222 the continuous and ongoing tillage (or other) operation.

In certain implementations, the subsequent operation may be a different operation (e.g., may not form part of a continuous series of operations with the first operation). For example, a first operation may be a primary tillage operation utilizing the implement 10, and a subsequent operation may be a secondary tillage operation utilizing a different implement (not shown), a baling operation, a seeding operation, and so on. As such, as described in greater detail below, analysis 210 of images that are captured 204 during a first tillage (or other) operation on a field may be utilized to control 222 a distinct and different operation on the field that occurs at a later point in time.

The control 222 of a subsequent operation by the RMRC process 200 may be based upon various aspects of residue coverage, as determined through the analysis 210 of various images of a relevant field. In certain implementations, for example, the RMRC process 200 may control 222 aspects of a subsequent operation based upon a target local percent residue coverage 212, a target global (i.e., field-wide) percent residue coverage 212, a target local residue size 214, a target global average residue size 214, and so on. The above-noted targets may be user-determined or may be determined automatically by the RMRC process 200 (e.g., based upon analysis of historical residue and other information). In certain implementations, the targets may be specific targets (e.g., 10% local percent residue coverage or 3-inch characteristic residue length). In certain implementations, the targets may include ranges (e.g., between 10% and 30% local percent residue coverage or between 3-inch and 6-inch characteristic residue length). In certain embodiments, the targets may vary across a particular field (e.g., 10% local percent residue coverage along flat portions of a field and 30% local percent residue coverage along sloped portions of the field).

The control 222 of a subsequent operation by the RMRC process 200 may include control 222 of various aspects of the subsequent operation, including vehicle speed, orientation and operation of various tools, rate of application of various substances (e.g., in a spraying operation), and so on. In certain implementations, the control 222 of an operation may include control of various tools through adjustment of tool angle and extension, tool rotational or articulation speed, or various other factors. Where the subsequent operation is a tillage operation, the control 222 of the operation may include adjusting 224 the depth or down-pressure of one or more tillage tools through automatic activation of various actuators. With reference to the implement 10, for example, the control 222 of a tillage operation may include activation of one or more of the hydraulic cylinders 32, 44, and 60 in order to adjust the orientation (or down-pressure) of, respectively, shanks 22, disks 46 and 48, and disks 62. For example, where residue coverage information determined through analysis 210 of one or more images indicates that a smaller residue size 214 or smaller percent residue coverage 212 is needed, the RMRC process 200 may activate various of the cylinders 32, 44, or 60 in order to increase the depth or down-pressure of various of the shanks 22, disks 46 and 48, and disks 62.

Where the control 222 of a subsequent operation includes control of an ongoing operation that includes the first operation, various control strategies may be employed. In certain implementations, as described above, various aft images 206 and forward images 208 from the first operation may be compared 216 in order to assess, in real-time, the effect of a particular operation on local (or global) residue coverage of a field. The residue information determined by the image comparison 216 may then be utilized to continually adjust and refine the orientation and operation of various tools or components in order to obtain a target residue coverage.

In certain implementations, forward images 208 may be analyzed 210 separately, in order to assess the characteristics of residue coverage on areas of a field that are immediately in front of a relevant implement (i.e., areas of the field that are about to be processed by the implement). Various aspects of the implement (e.g., the orientation and operation of various tools or components) may then be preemptively adjusted in order to address the oncoming residue coverage. For example, if analysis 210 of a forward image 208 identifies a particularly high level of residue coverage, relative to a target residue coverage, various tools of an implement (e.g., the disk gang assemblies 42 of the implement 10) may be articulated to a particular aggressive orientation.

Similarly, in certain implementations, aft images 206 may be analyzed 210 separately, in order to assess the characteristics of residue coverage on areas of a field that are immediately behind a relevant implement (i.e., areas of the field that have just been processed by the implement). Various aspects of the implement (e.g., the orientation and operation of various tools or components) may then be adjusted in order to effect changes in residue coverage of upcoming areas. For example, if analysis 210 of an aft image 206 identifies a particularly high level of residue coverage, relative to a target residue coverage, various tools of an implement (e.g., the disk gang assemblies 42 of the implement 10) may be articulated to a particular aggressive orientation.

In certain implementations, one or more of the above control strategies (or others) may be utilized in various combinations. For example, with respect to the implement 10, the control 222 of a subsequent portion of an ongoing tillage operation may include analyzing 210 forward images 208 in order to preemptively adjust 224 depth of the disks 46 and 48, as well as analyzing 210 aft images 206 in order to fine tune the adjustments 224 of the disks 46 and 48, in light of their effect on residue coverage.

Where the control 222 of a subsequent operation includes control of a subsequent operation that is distinct (e.g., substantially removed in time) from the first operation, various control strategies may also be employed. In certain implementations, as described above, various aft images 206 and forward images 208 from a first operation may be compared 216 in order to assess the effect of a particular operation on local (or global) residue coverage of a field. This residue coverage information may then be associated 218 with a particular location in the field and stored for later retrieval. (Alternatively, the images 206 and 208 themselves may be associated 218 with a particular field location and themselves stored for later comparison 216 or other analysis 210). The residue information determined by the image comparison 216 may then be utilized in a subsequent (e.g., substantially later) operation to adjust and refine the orientation and operation of various tools or components at particular field locations in order to obtain a target residue coverage.

In certain implementations, for example, a primary operation may include a fall tillage operation by the implement 10. As the implement 10 travels over the field 16, the camera assemblies 76 and 78 may capture 204 various images 206 and 208, which may be analyzed 210 to determine residue coverage information for associated 218 locations on the field 16. During a distinct, later operation using a different tillage implement (e.g., a spring tillage operation using a spring field cultivator), this residue coverage information may then be retrieved in order to adjust and refine the orientation and operation of various tools or components of the different tillage implement in order to obtain a target residue coverage at particular field locations.

In certain implementations, aspects of a subsequent operation may be similarly controlled 222 based upon separate analysis of aft images 206, forward images 208, or both. For example, as the implement 10 travels over the field 16, the aft camera assembly 74 may capture 204 various aft images 206, which may be analyzed 210 to determine, for various associated 218 locations on the field 16, the percent residue coverage 212 or residue size 214 after passage of the implement 10 (e.g., the final percent residue coverage 212 or residue size 214 for various field locations). During a subsequent operation (e.g., a later secondary tillage operation) the RMRC process 200 may then utilize this residue coverage information to control 222 various aspects of the subsequent operation.

It will be understood that the various types of analysis 210, control 222, and so on contemplated by this disclosure may alternatively (or additionally) be applied with respect to non-tillage operations. For example, the RMRC process 200 may include capture 204 of images during a combine operation and control 222 of various tools or components during a baling operation, control 222 of various tools or components during a planting or other operation, and so on.

As will be appreciated by one skilled in the art, the disclosed subject matter may be embodied as a method, system, (e.g., a control system for implement 10) or computer program product. Accordingly, certain embodiments may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for residue management with an agricultural implement including at least one camera assembly, the method comprising:
   executing an operation on a field with the implement, the operation resulting in residue on the field;
   capturing, with the at least one camera assembly, a first image of an area of the field when the area is ahead of the implement;
   capturing, with the at least one camera assembly, a second image of the area of the field when the area is behind the implement;
   analyzing the first and second images, by one or more computing devices, to determine one or more indicators of residue coverage on the area of the field;
   determining, by the one or more computing devices, an effect of the operation on residue coverage of the field, based upon the determined one or more indicators; and
   controlling, by the one or more computing devices, one or more aspects of a subsequent operation on the field based upon the determined one or more indicators.

2. A method for residue management for an agricultural implement with at least one camera assembly, the method comprising:
   executing a first operation on a field with the implement, the first operation resulting in residue on the field;
   capturing, with the at least one camera assembly, a first image of an area of the field that is ahead of the implement and a second image of an area of the field that is behind the implement;
   analyzing the first and second images, by one or more computing devices, to acquire and compare residue information from each of the first and second images to determine an indicator of residue coverage on the field;
   executing a subsequent operation on the field; and
   controlling, by the one or more computing devices, one or more aspects of the subsequent operation based upon, at least in part, the determined indicator of residue coverage.

3. The method of claim 2, wherein the subsequent operation utilizes a different implement and does not form part of a continuous series of operations with the first operation.

4. The method of claim 2, further comprising:
   associating the indicator of residue coverage with a location of the implement on the field; and
   controlling the one or more aspects of the subsequent operation further based upon, at least in part, the location.

5. The method of claim 2, wherein the implement is a tillage implement having a plurality of ground-engaging tillage tools;
   wherein the first operation includes a first portion of a tillage operation on the field;
   wherein the subsequent operation includes a second portion of the tillage operation on the field; and
   wherein controlling the one or more aspects of the subsequent operation includes adjusting at least one of a depth and a down-pressure of at least one of the plurality of tillage tools based upon the determined indicator of residue coverage.

6. The method of claim 2, wherein the determined indicator of residue coverage includes an indicator of percent coverage.

7. The method of claim 2, wherein the determined indicator of residue coverage includes an indicator of residue size.

8. The method of claim 2, wherein the at least one camera assembly includes at least one of a stereo image camera assembly and an infrared camera system.

9. The method of claim 2, wherein a portion of the field included in the second image is also included in the first image.

10. The method of claim 2, wherein the one or more computing devices determine a first indicator of residue coverage of the area of the field associated with the first image and a second indicator of residue coverage of the area of the field associated with the second image; and
   wherein the one or more computing devices compare the first and second indicators of residue coverage to determine a change in residue coverage.

11. The method of claim 2, wherein the at least one camera assembly includes an aft camera and a forward camera spaced from the aft camera in a direction of travel of the implement.

12. A control system for operation of one or more agricultural operations on a field with residue, the control system comprising:
   a camera assembly including a first camera and a second camera spaced from the first camera in a direction of travel of a tillage implement;
   one or more processor devices in communication with the camera assembly; and
   one or more memory architectures coupled with the one or more processor devices;
   wherein the one or more processor devices are configured to:
      identify the execution of a first tillage operation on the field with the tillage implement, the first operation resulting in residue on the field;
      cause the camera assembly to capture first and second images of first and second areas of the field that are ahead of and behind the tillage implement;
      analyze the first and second images to determine an indicator of residue coverage on the field;
      identify the execution of a subsequent operation on the field; and
      control one or more aspects of the subsequent operation on the field based upon, at least in part, the determined indicator of residue coverage.

13. The control system of claim 12, wherein the subsequent operation utilizes a different implement and does not form part of a continuous series of operations with the first operation.

14. The control system of claim 12, wherein the one or more processor devices are further configured to:
   associate the indicator of residue coverage with a location of the tillage implement on the field; and
   control the one or more aspects of the subsequent operation further based upon, at least in part, the location.

15. The control system of claim 14, wherein the tillage implement includes a plurality of ground-engaging tillage tools;
   wherein the first operation includes a first portion of a tillage operation on the field;
   wherein the subsequent operation includes a second portion of the tillage operation on the field; and
   wherein controlling the one or more aspects of the subsequent operation includes adjusting at least one of a depth and a down-pressure of at least one of the plurality of tillage tools based upon the determined indicator of residue coverage.

16. The control system of claim 12, wherein the determined indicator of residue coverage includes an indicator of percent coverage.

17. The control system of claim 12, wherein the determined indicator of residue coverage includes an indicator of residue size.

18. The control system of claim 12, wherein the camera assembly is at least one of a stereo image camera assembly and an infrared camera system.

19. The control system of claim 12, wherein a portion of the field included in the second image is also included in the first image.

20. The control system of claim 12, wherein the one or more processor devices determine a first indicator of residue coverage of the area of the field associated with the first image and a second indicator of residue coverage of the area of the field associated with the second image; and wherein the one or more processor devices compare the first and second indicators of residue coverage to determine a change in residue coverage.

* * * * *